United States Patent [19]

Jang et al.

[11] Patent Number: 5,119,735
[45] Date of Patent: Jun. 9, 1992

[54] TRAVELING EYELET

[76] Inventors: Young H. Jang; Hyang S. J. Park, both of 9208 Bloomfield #76, Cypress, Calif. 90630

[21] Appl. No.: 608,164

[22] Filed: Oct. 31, 1990

[51] Int. Cl.⁵ .................. A01K 75/00; B61B 12/02
[52] U.S. Cl. .................... 105/151; 43/27.2; 104/93; 105/153; 294/82.23
[58] Field of Search .................. 294/74–77, 294/82.1–82.14, 82.17–82.24, 85; 24/598.4, 598.7, 600.4; 43/8, 27.2; 59/85, 86, 89, 93; 104/89, 93, 111, 112, 115, 118; 105/148, 150, 151, 153

[56] References Cited

U.S. PATENT DOCUMENTS

| | | | |
|---|---|---|---|
| 973,633 | 10/1910 | Davis | 105/151 X |
| 1,087,440 | 2/1914 | Freed | 105/151 X |
| 1,373,235 | 3/1921 | Giberson | 294/82.21 |
| 1,427,724 | 8/1922 | Clay | 294/74 |
| 1,523,765 | 1/1925 | Gilchrist | 294/82.23 |
| 1,747,388 | 2/1930 | Pearson | 105/153 |
| 2,639,535 | 5/1953 | Greske | 104/93 X |
| 2,718,852 | 9/1955 | Cacciatore | 104/93 X |
| 3,704,350 | 11/1972 | Itoh | 105/151 X |

FOREIGN PATENT DOCUMENTS 1375787 9/1964 France .
626006 9/1978 U.S.S.R. .

Primary Examiner—Johnny D. Cherry
Attorney, Agent, or Firm—Roger A. Marrs

[57] ABSTRACT

An eyelet of high strength materials is disclosed herein having an upper end equipped with a tapered roller for movably supporting the eyelet on a cable and having a lower end equipped with a similar roller for supporting the end of the lower end of the eyelet from chaff by the cable. The eyelet is composed of stainless steel in the form of an oval-shaped rod in front elevation having a U-shaped upper end joined with a U-shaped lower end by outwardly diverging side members. A selected side member includes a spring-released latch normally biased closed to maintain the load-supporting cable captured within the eyelet between the roller. Lubricating fittings and disassembly construction for maintenance and repair is employed in mounting the rollers.

1 Claim, 1 Drawing Sheet

TRAVELING EYELET

BACKGROUND OF THE INVENTION

1. Field of the Invention

The present invention relates to the field of load bearing eyelets intended to travel along a taut cable and more particularly to a novel traveling eyelet having upper and lower tapered rollers mounted between side members of a stainless steel frame having lubricating fittings and disassembly construction as well as a releasable latch for gaining access to the interior of the eyelet.

2. Brief Description of the Prior Art

In the past, it has been the conventional practice to employ a traveling eyelet in connection with movably supporting the edge marginal region of a fishing net to a length of rigid support cable. The eyelets are used in serial fashion adjacent to one another and each eyelet is connected to a portion of the fishing net so that all of the eyelets support the entire fishing net in combination. Floats or other buoyant means are provided on the edge of the net so that the net is further supported on the surface of the sea and the eyelets are primarily employed for supporting the net as the net is payed out from the stern of a boat or drawn back into the boat over its stern. Under such operating conditions, great wear and strain is placed on the eyelets due to the extremely heavy loading conditions and transfering as well as distribution of loads from the net to the supporting cable via the eyelets.

In an attempt to provide traveling eyelets, it has been the conventional practice to design an eyelet having a rigid cross member joining opposite sides of the eyelet at the upper end and providing a rounded bight at its lower end. The rigid cross member in combination with the top or upper end of the eyelet forms an opening through which the supporting cable is disposed and the cable rides on the eyelet frame itself and, in some instances, will ride against the rigid crossbar or member. A net supporting cable is tied or laid against the semicircular rigid lower end of the frame of the eyelet so that a portion of the net is supported thereby. Using such a conventional eyelet causes extreme wear and strain on the eyelet since no parts of the eyelet move and the material of the eyelet is substantially fatigued so as to cause cracking, breaking and damage not only to the eyelet but to the supporting cable as well. Since there are no moving parts on the eyelet, lubricant such as greases and oils are manually placed on the external surfaces of the rigid bar as well as the curved lower portion or end in order to permit sliding of the cables they are against. However, the grease or oil is soon dissipated and metal to metal wearing takes place.

Therefore, a long standing need has existed to provide a novel traveling eyelet which includes antifriction means for reducing wear and damage between metal parts on which the eyelet is supported. Such an eyelet will have lubricating means and will include a construction permitting disassembly so that worn or damaged parts can be readily replaced.

SUMMARY OF THE INVENTION

Accordingly, the above problems and difficulties are obviated by the present invention which provides a novel traveling eyelet having upper and lower U-shaped ends joined together by diverging side members whereby a pair of openings are provided and are separated by a first antifriction means carried on the upper end of the eyelet and which further includes a second antifriction means carried on the lower eyelet portion or end which defines an intermediate opening. A selected one of the side members includes a spring release latch that is normally biased to its closed position so that a passageway is selectively opened and closed permitting access to the intermediate opening.

In one form of the invention, the first and second antifriction means includes tapered rollers which are movably carried on axles between the side members and which further includes lubrication means for introducing a pressurized lubricant to the bearing assemblies of the antifriction means. Disassembly construction is provided for maintenance and service purposes so that the antifriction devices may be removed for repair or replacement.

Therefore, it is among the primary objects of the present invention to provide a novel traveling eyelet for use in supporting extremely heavy loads which includes antifriction means for movably supporting the eyelet on a rigid cable and which further includes antifriction means for supporting a load depending from the eyelet.

Another object of the present invention is to provide a novel load bearing eyelet having antifriction means defining an opening by which access is gained by a spring release latch which is normally biased into a closed position.

Yet another object of the present invention is to provide a novel spring latch closure device for a load bearing eyelet having a manual release and having a resilient means normally biasing the latch to its closed position.

Still another object of the present invention is to provide a novel traveling eyelet having antifriction means such as rollers incorporated thereon which include means for lubricating the bearings of the rollers and which further include a mounting construction that is readily disassembled for repair and maintenance purposes.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
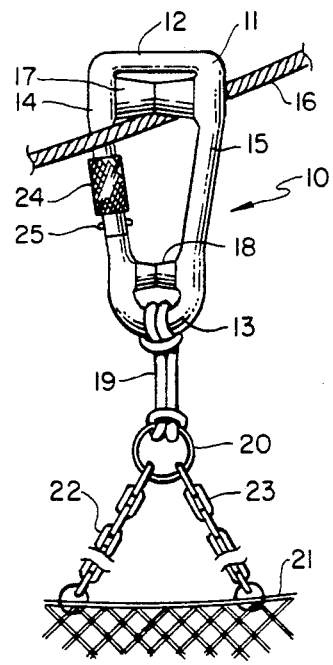
FIG. 1 is a front perspective view of the novel traveling eyelet incorporating the present invention and illustrated in combination with a supporting cable and a portion of a fishing net comprising a substantial load.

Referring to FIG. 1, the novel traveling eyelet of the present invention is illustrated in the general direction of arrow 10 which includes a closed frame 11 comprising an upper U-shaped portion or end 12 and a lower U-shaped portion 13 wherein the portions are joined together by side members 14 and 15, respectively. The eyelet is shown movably supported on a taut supporting cable 16 by means of a first antifriction device taking the form of a tapered roller 17.

The lower portion or end of the eyelet includes a second antifriction device taking the form of a tapered roller 18 and a load bearing cable 19 is illustrated as being tied over the portion 13 with a portion downwardly depending beyond the eyelet to terminate in connection with a load ring 20 coupled to the edge marginal region of a portion of a net 21 by chains 22 and 23, respectively. Therefore, it can be seen that an intermediate opening is defined between the first and second antifriction rollers 17 and 18 and between the opposing surfaces of the side members 14 and 15. The supporting cable 16 is disposed within the opening and is in rollable or movable contact with the roller 17. Access to the opening is gained by means of a quick release latch, taking the form of a movable sleeve 24 operated by a thumb or finger release 25. The sleeve 24 alternately opens and closes a passageway in the side member 14 so that the cable 16 may readily be passed in and out of the opening. The latch includes a resilient means for normally biasing the sleeve 24 into the closed position.

Figure 2:
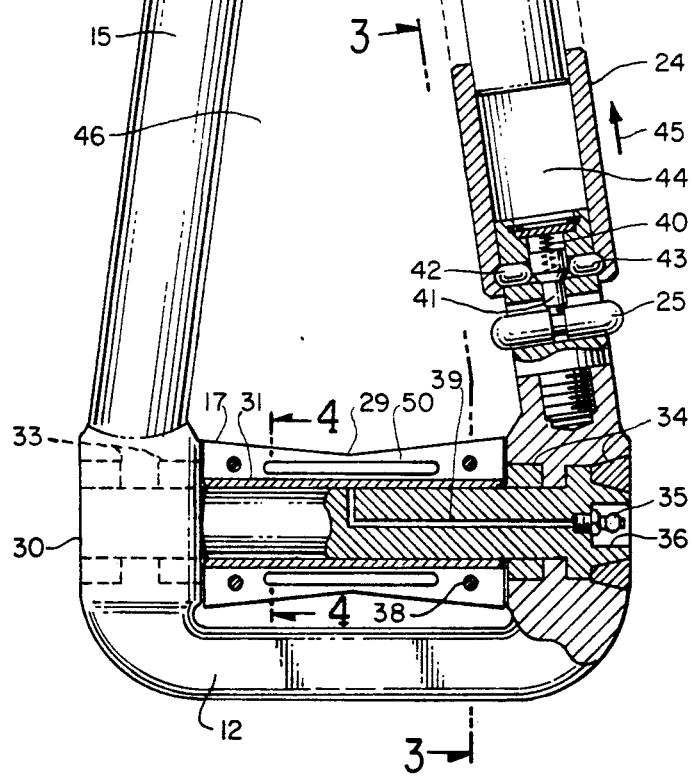
FIG. 2 is an enlarged front elevational view, partly in section, of the novel traveling eyelet as shown in FIG. 1.
Figure 3:
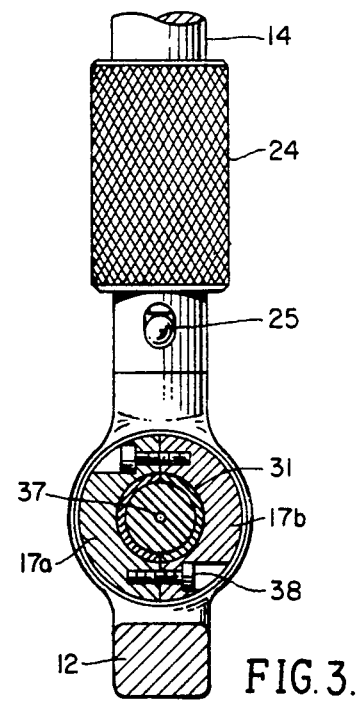
FIG. 3 is a transverse cross sectional view of the eyelet taken in the direction of arrows 3—3 of FIG. 2.
Figure 4:
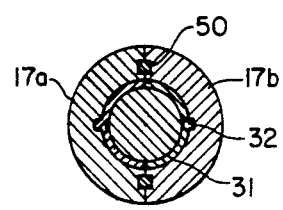
FIG. 4 is a transverse cross-sectional view of FIG. 2 taken in the direction of arrows 4—4 thereof.

Referring now in detail to FIGS. 2 and 3, it can be seen that the eyelet can mount the roller 18 on an axle 26 having its opposite ends held in position between the legs 14 and 15, respectively. If it is desired to remove the roller 18 for service and maintenance purposes, the axle 26 may be readily knocked from its mounting by means of a punch and hammer. The semicircular or U-shaped end 13 along with the roller 18 defines an opening indicated by numeral 27 adapted to be occupied by the knot or connection fitting with the load bearing coupling cable 19. The roller 18 includes a reduced center 28 so that the end of the connection cable 19 may be readily accommodated thereon so that load distribution will be equally divided not only along the roller but along the axle 26. The construction of roller 17 is similar to roller 18 in that it has a reduced center 29 to accommodate centering of the supporting cable 16 in the center of the roller for equal load distribution. The roller 17 is carried on an axle 30 having its opposite ends held on members 14 and 15, respectively, adjacent to the U-shaped end 12. A journal bearing 31 supports the roller on the mid-section of the axle or mounting shaft 30 and the bearing is held in place by spring clips such as clip 32. Weldments 33 support the shaft on one end while weldments 34 support the opposite end of the axle. A lubricating means is provided through the axle or shaft which includes a fitting 35 projecting through a recess 36 in the end of the shaft while a passageway 37 extends through the central portion of the axle to terminate adjacent the journal bearing 31 so that a high pressure lubricant may be introduced to the bearing surfaces.

Referring now in detail to FIG. 3, it can be seen that the roller 17 is composed of portions 17a and 17b that are joined by fasteners such as a screw 38. Such construction provides for easily assembling or disassembling the roller for service and maintenance purposes. Key bars 50 align the portions.

The releasable latch mechanism is illustrated in FIG. 2 wherein it can be seen that a spring 40 may bias a latch member 41 so as to separate a pair of detents 42 and 43 into engagement with holes on the inside surface of the sleeve 24. In this position, the sleeve is in its lowered or closed position with respect to the passageway as indicated by numeral 44. In order to release the latch, grip member 25 is raised upwardly in the direction of arrow 45 against the tension of spring 40 so that the latch member 41 moves upwardly to permit the detents 42 and 43 to come towards one another out of the holes in the inside wall surface of the sleeve 24. This releases the sleeve so that it may be moved in direction of arrow 45 to the position shown in broken lines to expose the passageway 44. When exposed, cables, lines or the like may be inserted into the intermediate or central opening indicated by the numeral 46.

Therefore, it can be seen that the traveling eyelet of the present invention provides a novel means for supporting an extremely heavy load from a rigid cable 16. Preferably, the material of the eyelet is composed of stainless steel so that maximum strength is afforded. The antifriction rollers are easy to maintain and may be readily serviced or replaced because of the novel eyelet construction.

While particular embodiments of the present have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A traveling eyelet movable along a cable comprising:
   an enclosed frame defining a central opening;
   a first and a second antifriction means operably mounted on said frame across said opening in spaced-apart relationship;
   a latch means carried on said frame for selectively opening and closing a passageway in said frame leading to said opening between said antifriction means;
   said antifriction means are rollers having reduced mid-sections between opposite ends;
   said frame per se includes an upper end and a lower end, each end being of U-shaped configuration joined by spaced-apart side members;
   said frame is composed of stainless steel;
   said second antifriction roller is constructed of two identical halves joined by removable fastener means; and
   a shaft rotatably carried on said frame;
   lubrication means operably carried on said shaft.

* * * * *